United States Patent Office 3,099,435
Patented July 30, 1963

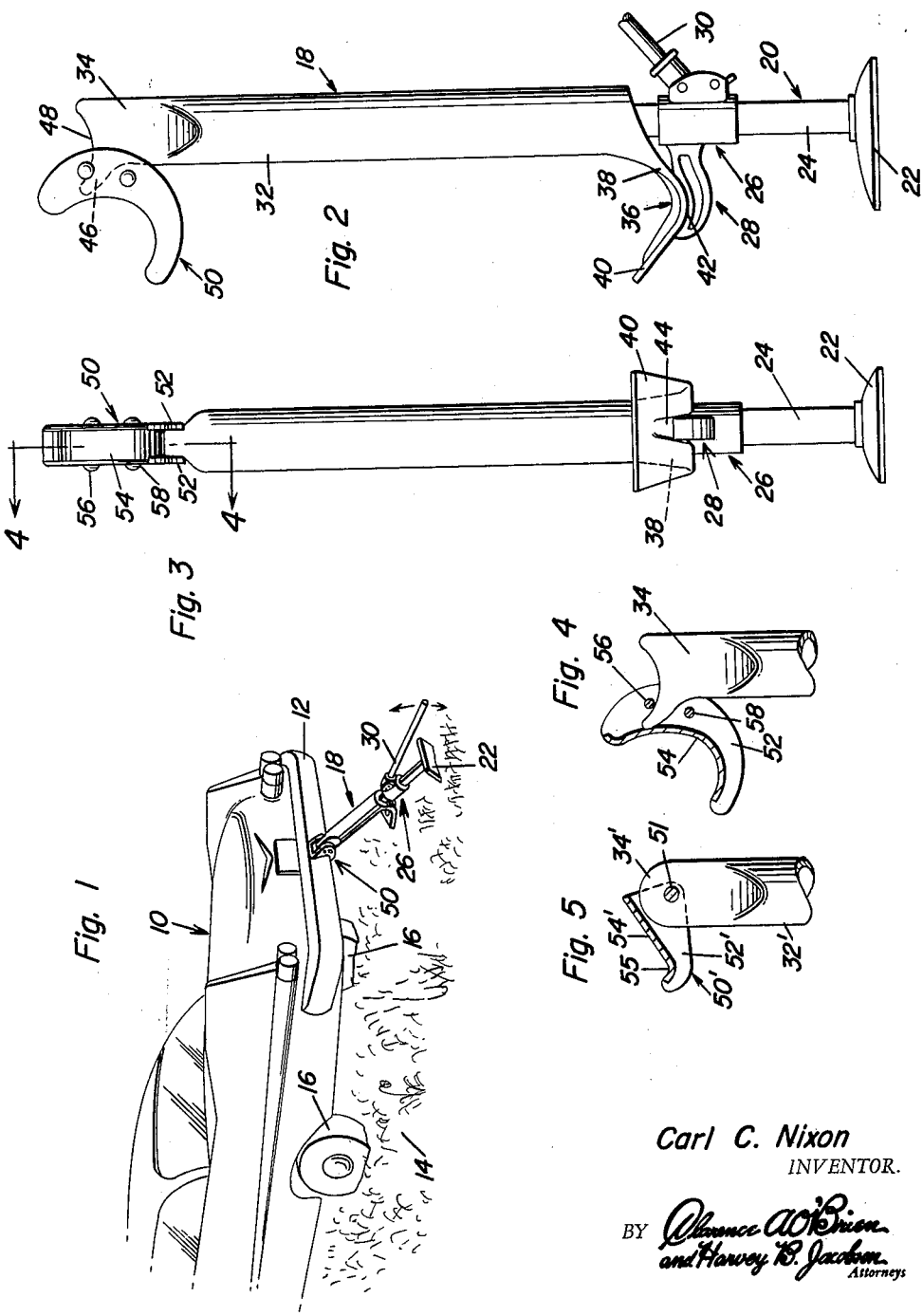

3,099,435
BUMPER JACK PUSHER EXTENSION
Carl C. Nixon, Pontiac, Mich.
(3522 W. Home Ave., Flint 4, Mich.)
Filed June 9, 1961, Ser. No. 116,157
10 Claims. (Cl. 254—35)

This invention relates to a novel and useful bumper jack pusher extension and is in the form of an upstanding elongated tubular member adapted to be telescoped over the upper end of a bumper jack standard remote from the base thereof. The lower end of the tubular member is provided with means adapted to be seated in the upwardly opening bumper jack hook carried by the lift frame which is mounted on the standard of the bumper jack for movement there along and a reaction thrust member defining an upwardly opening and transversely extending concave recess is carried by the upper end of the elongated tubular member and is adapted to embracingly engage a vehicle bumper. Bumper jacks are conventionally provided with enlarged bases at the lower ends of their standards and if a vehicle has become stuck in a ditch the bumper jack extension of the instant invention is telescoped over the upper end of the conventional bumper jack standard. Then, the reaction thrust member carried by the upper end of the tubular member is engaged with the bumper of the vehicle while the base of the bumper jack is engaged with the ground. Thus, as the lift frame of the bumper jack is jacked along the standard of the bumper jack, it will extend the tubular member telescoped over the upper end of the bumper jack standard thereby changing the conventional bumper jack into an extensible motor having a reaction thrust surface on one end defined by the reaction thrust member carried by the bumper jack extension and a reaction thrust surface on the other end defined by the base of the jack standard. Although the bumper jack extension of the instant invention has been specifically adapted for use with vehicles, it may be readily appreciated that the extension, when used in conjunction with a bumper jack, may readily find use in other environments.

The main object of this invention is to provide a bumper jack extension or attachment for a conventional type of bumper jack including a base, a jack standard rising from the base and a lift frame mounted on the standard for movement there along which may be used to convert a conventional bumper jack into an extensible motor with reaction thrust surfaces on the remote ends thereof.

A further object of this invention, in accordance with the immediately preceding object, is to provide a bumper jack extension provided with a reaction thrust member specifically adapted to embracingly engage a portion of a vehicle bumper.

Yet another object of this invention is to provide a tubular member of the instant invention comprising the portion of the extension which is to be telescoped over the upper end of a jack standard with a laterally directed and upwardly opening generally V-shaped plate member on its lower end adapted to be seatingly engaged in the conventional upwardly opening bumper hook carried by the lift frame on conventional bumper jacks. In this manner, the tubular member of the instant invention may be constructed of sufficient diameter to readily telescope over bumper jack standards of various sizes and shapes with the laterally directed upwardly opening V-shaped plate member seatingly engaged in the upwardly opening bumper hook provided by the lift frame of the bumper jack in order that the tubular member may be engaged by the bumper jack lift frame in a manner whereby rotational movement of the tubular member relative to the bumper jack standard is prevented.

Still another object of this invention is to provide the outer end of the upwardly opening and laterally directed V-shaped plate member with a transversely extending cutting edge whereby this cutting edge may be utilized as a cutting implement such as a grub axe when it becomes necessary to cut undergrowth in which a vehicle has become stuck.

A final object of this invention to be specifically enumerated herein is to provide a bumper jack extension which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the rear portion of a vehicle shown with the bumper jack extension and an associated bumper jack being operatively disposed relative to each other and in position to be utilized in order to effect an upward and forward thrust on the rear end of the vehicle;

FIGURE 2 is a side elevational view of a conventional type of bumper jack shown with the bumper jack extension operatively connected thereto;

FIGURE 3 is an end elevational view of the embodiment illustrated in FIGURE 2 as seen from the left side of the latter;

FIGURE 4 is a fragmentary vertical sectional view taken substantially upon the plane indicated by the section line 4—4 of FIGURE 3; and FIGURE 5 is a vertical sectional view similar to that of FIGURE 4 but showing a modified form of bumper jack extension.

Referring now more specifically to the drawings the numeral 10 generally designates a vehicle which is provided with a rear bumper 12. The vehicle is disposed on a soft ground surface 14 and has its rear wheels 16 embedded in the ground in a manner to prevent the rear wheels 16 from effecting forward movement of the vehicle 10.

The bumper jack extension of the instant invention is generally designated by the reference numeral 18 and is illustrated in FIGURES 1–3 of the drawings operatively associated with a conventional form of bumper jack which is generally designated by the reference numeral 20. The bumper jack 20 includes an enlarged base portion 22, an upright jack standard 24 and a lift frame generally referred to by the reference numeral 26 of conventional design provided with a laterally directed and upwardly opening bumper hook generally referred to by the reference numeral 28. The lift frame 26 includes a pivotally mounted lever arm 30 which may be manipulated in order to move the lift frame 26 upwardly along the standard 20.

The bumper jack extension 18 comprises an upstanding elongated tubular member 32 which is closed at its upper end as at 34. The tubular member 18 includes an upwardly opening and laterally directed V-shaped plate member generally referred to by the reference numeral 36 which includes a first leg 38 which projects downwardly and outwardly away from the tubular member 32 and a second leg 40 that projects upwardly and outwardly away from the free end of the leg 38. With attention invited to FIGURES 2 and 3 of the drawings it will be noted that the undersurfaces of the legs 38 and 40 adjacent the apex 42 of the V-shaped plate member 36 are provided with communicated downwardly opening grooves 44 which seatingly receive the upper surfaces of the bumper hook 28 and thus prevent rotation of the tubular member 32 relative to the standard 24.

The upper end of the tubular member 32 is provided with a laterally projecting and upwardly opening hook member 46 which defines an upwardly opening concave recess 48 that extends transversely of the tubular member 32.

A reaction thrust member generally referred to by the reference numeral 50 comprises a generally inverted U-shaped member having a pair of generally parallel legs 52 interconnected by means of a transversely curved bight portion 54. A pair of support pins 56 and 58 are secured between the legs 52 a spaced distance from the bight portion 54 and spaced relative to each other transversely of the bight portion 54. The hook member 46 is received between the support pins 56 and 58 to rockably mount the reaction thrust member 50 on the upper end of the tubular member 32 for movement about an axis extending transversely of the hook member 46.

With attention now invited to FIGURE 5 of the drawings there will be seen a modified form of tubular member referred to by the reference numeral 32'. The upper end of the tubular member 32' is flattened as at 34' and has a reaction thrust member generally referred to by the reference numeral 50', pivotally secured thereto by means of the pivot pin 51. The reaction thrust member 50' also includes a pair of legs 52' which are interconnected by means of a transversely curved bight portion 54' and the curved end 55 of the bight portion 54' may be engaged with the bumper 12 in the same manner in which the reaction thrust member 50 is engaged with the bumper 12 in FIGURE 1. Further, the reaction thrust member 50 may be readily disengaged from the tubular member 32 and the upwardly opening concave transversely extending recess 48 may be utilized to embrace a portion of the bumper 12.

In operation, if it is desired to free a vehicle such as vehicle 10 from a position with its rear wheels 16 embedded in the ground 14, the base 22 of the jack 20 is engaged with the ground as illustrated in FIGURE 1 and the tubular member 32 is telescopingly engaged over the upper end of the jack standard 24. Then, the jack standard is forwardly and upwardly inclined and the reaction thrust member 50 is engaged with the bumper 12. Then, the lever 30 may be utilized to effect movement of the lift frame 26 upwardly along the jack standard 24 whereby the extensible motor defined by the jack 20 and the bumper jack extension 18 will effect an upward and forward thrust on the rear bumper 12 of the vehicle 10 in order to force the vehicle 10 forwardly over the soft ground 14.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A bumper jack extension for converting a conventional bumper jack of the type including a base, a jack standard rising from said base and an upwardly opening bumper hook on a lift frame mounted on said standard for movement there along, to an extensible motor having two telescoped sections, said bumper jack extension comprising an upstanding elongated tubular member of a size so as to be telescoped over the upper end of the bumper jack standard remote from the base thereof, the lower end of said tubular member including means for seating in the upwardly opening bumper hook carried by said lift frame, and a reaction thrust member carried by the upper end of said tubular member for engagement with a vehicle bumper whereby said bumper jack standard may be oriented upwardly and in the direction of desired movement of a disabled vehicle with said base engaged with the ground and said reaction thrust member engaged with the bumper of said disabled vehicle said upper end of said tubular member including at least one laterally projecting hook member defining an upwardly opening concave recess.

2. The combination of claim 1 wherein said reaction thrust member comprises a generally inverted U-shaped member having a pair of generally parallel legs interconnected at corresponding ends by means of a transversely curved bight portion, a pair of support pins secured between said legs spaced from said bight portion and spaced relative to each other transversely of said bight portion between which said hook member is loosely and removably received for mounting said reaction thrust member on said tubular member.

3. A bumper jack extension for converting a conventional bumper jack of the type including a base, a jack standard rising from said base and an upwardly opening bumper hook on a lift frame mounted on said standard for movement therealong, to an extensible motor having two telescoped sections, said bumper jack extension comprising an upstanding elongated tubular member of a size so as to be telescoped over the upper end of the bumper jack standard remote from the base thereof, the lower end of said tubular member including means for seating in the upwardly opening bumper hook carried by said lift frame, and a reaction thrust member carried by the upper end of said tubular member for engagement with a vehicle bumper whereby said bumper jack standard may be orientated upwardly and in the direction of desired movement of a disabled vehicle with said base engaged with the ground and said reaction thrust member engaged with the bumper of said disabled vehicle, said reaction thrust member defining an arcuate pocket extending transversely of said tubular member and opening toward the upper end thereof.

4. The combination of claim 3 wherein said reaction thrust member is rockably mounted on said upper end of said tubular member for movement about an axis extending transversely thereof.

5. The combination of claim 4 including means limiting rocking movement of said reaction thrust member.

6. The combination of claim 3 wherein said means adapted for seating engagement with said bumper hook comprises an upwardly opening laterally directed V-shaped plate member having one leg thereof extending outwardly and downwardly from said tubular member with the other leg thereof extending upwardly and outwardly from the free end of said one leg.

7. The combination of claim 6 wherein the undersurfaces of said legs each have a downwardly opening groove formed therein adjacent the apex of said V-shaped plate member adapted for seatingly receiving the upper surfaces of said bumper hook.

8. The combination of claim 3 wherein said reaction thrust member is pivotally secured to the tubular member.

9. A bumper jack extension for converting a conventional bumper jack of the type including a base, a jack standard rising from said base and an upwardly opening bumper hook on a lift frame mounted on said standard for movement therealong, to an extensible motor having two telescoped sections, said bumper jack extension comprising an upstanding elongated tubular member of a size so as to be telescoped over the upper end of the bumper jack standard remote from the base thereof, the lower end of said tubular member including means for seating in the upwardly opening bumper hook carried by said lift frame, said means comprising an upwardly opening laterally directed V-shaped plate member having one leg thereof extending outwardly and downwardly from said tubular member with the other leg thereof extending upwardly and outwardly from the free end of said one leg, the upper end of said tubular member being adapted for carrying a reaction thrust member engageable with a vehicle bumper, said reaction thrust member to define an arcuate pocket extending transversely of said tubular member and opening toward the upper end thereof, whereby said bumper jack standard may be orientated upwardly and in the direction of desired movement of the disabled vehicle with said base engaged with the ground and said reaction thrust member engaged with the bumper of said disabled vehicle.

10. A bumper jack extension for converting a conventional bumper jack of a type including a base, a jack standard rising from said base and an upwardly opening bumper hook on a lift frame mounted on said standard for movement therealong, to an extension motor having two telescoped sections, said bumper jack extension comprising an upstanding elongated tubular member of a size so as to be telescoped over the upper end of the bumper jack standard remote from the base thereof, the lower end of said tubular member including means for seating in the upwardly opening bumper hook carried by said lift frame, said means comprising an upwardly opening laterally directed V-shaped plate member having one leg thereof extending outwardly and downwardly from said tubular member with the other leg thereof extending upwardly and outwardly from the free end of said one leg, the undersurfaces of said legs each having a downwardly opening groove formed therein adjacent the apex of said V-shaped plate member for seatingly receiving the upper surfaces of said bumper hook, and the upper end of said tubular member being adapted to carry a reaction thrust member for engagement with a vehicle bumper whereby said bumper jack standard may be orientated upwardly and in the direction of the desired movement of a disabled vehicle with said base engaged with the ground and said reaction thrust member engaged with the bumper of said disabled vehicle.

References Cited in the file of this patent
UNITED STATES PATENTS

| | | |
|---|---|---|
| 1,482,846 | Harrah | Feb. 5, 1924 |
| 1,648,188 | Maltrup | Nov. 8, 1927 |
| 1,805,289 | Kuno | May 12, 1931 |
| 1,845,222 | Birn | Feb. 16, 1932 |
| 2,259,789 | Akins | Oct. 21, 1941 |